United States Patent [19]
Brosch et al.

[11] Patent Number: 5,794,244
[45] Date of Patent: Aug. 11, 1998

[54] DATA STORAGE SYSTEM WITH TABLE-DRIVEN DEVICE SELECTOR

[75] Inventors: Erika Marianna Brosch; John Randolph Hagenbuch; Linda Jean Schiltz, all of Tucson, Ariz.

[73] Assignee: International Business Machines Corporation, Armonk, N.Y.

[21] Appl. No.: 658,039

[22] Filed: Jun. 4, 1996

[51] Int. Cl.$^6$ ........................................ G06F 17/30
[52] U.S. Cl. .................... 707/100; 707/104; 711/117; 711/114; 711/172
[58] Field of Search ................ 707/104, 204, 707/100; 711/117, 114, 172

[56] References Cited

U.S. PATENT DOCUMENTS

| | | | |
|---|---|---|---|
| 5,235,695 | 8/1993 | Pence | 711/172 |
| 5,253,246 | 10/1993 | Leonhardt et al. | 369/291 |
| 5,303,214 | 4/1994 | Kulakowski et al. | 369/34 |
| 5,388,260 | 2/1995 | Monahan et al. | 395/608 |
| 5,416,914 | 5/1995 | Korngiebel et al. | 711/114 |
| 5,479,581 | 12/1995 | Kleinschnitz | 395/582 |

*Primary Examiner*—Thomas G. Black
*Assistant Examiner*—Jean M. Corrielus
*Attorney, Agent, or Firm*—Gray Cary Ware Freidenrich

[57] ABSTRACT

In response to a storage access request, eligible data storage device types are efficiently identified in a data storage library. A list of the appropriate data storage device types is prepared by indexing attributes with corresponding pre-prepared tables and then combining the resultant indices. In one embodiment, the attributes may include recording technology ("RT") and media type ("MT") attributes. First, a user request is received for data access in the library. The request includes the RT and MT attributes. The RT attribute is indexed to a RT table to yield a RT mask. The MT attribute is similarly indexed to a MT table to yield a MT mask. In the RT and MT masks, storage device types may be represented by different codes to preference the device types with respect to each other. A request mask is prepared by performing a Boolean operation, such as AND, to combine the MT mask and the RT mask. The request mask identifies all data storage device types in the library compatible with the received request.

66 Claims, 4 Drawing Sheets

RECORDING TECHNOLOGY (WRITE)

| | RT | D1 | D2 | D3 | D4 |
|---|---|---|---|---|---|
| 408 → | R0 | 0001 | 0001 | 0001 | 0000 |
| 409 → | R1 | 0001 | 0000 | 0000 | 0000 |
| 410 → | R2 | 0000 | 0001 | 0000 | 0000 |
| 411 → | R3 | 0000 | 0000 | 0001 | 0000 |
| 412 → | R4 | 0000 | 0000 | 0000 | 0000 |

← 400

402  403  404  405  406

MEDIA TECHNOLOGY (WRITE)

| | MT | D1 | D2 | D3 | D4 |
|---|---|---|---|---|---|
| 606 → | M0 | 0011 | 0011 | 0011 | 0000 |
| 607 → | M1 | 0011 | 0011 | 0000 | 0000 |
| 608 → | M2 | 0000 | 0011 | 0000 | 0000 |
| 609 → | M3 | 0000 | 0000 | 0011 | 0000 |
| 610 → | M4 | 0000 | 0000 | 0000 | 0000 |

← 600

602  603  604  605  606

RECORDING TECHNOLOGY (WRITE)

| RT | D1 | D2 | D3 | D4 |
|---|---|---|---|---|
| R0 | 0001 | 0001 | 0001 | 0000 |
| R1 | 0001 | 0000 | 0000 | 0000 |
| R2 | 0000 | 0001 | 0000 | 0000 |
| R3 | 0000 | 0000 | 0001 | 0000 |
| R4 | 0000 | 0000 | 0000 | 0000 |

RECORDING TECHNOLOGY (READ)

| RT | D1 | D2 | D3 | D4 |
|---|---|---|---|---|
| R0 | N/A | N/A | N/A | N/A |
| R1 | 0011 | 0001 | 0000 | 0000 |
| R2 | 0000 | 0001 | 0000 | 0000 |
| R3 | 0000 | 0000 | 0001 | 0000 |
| R4 | 0000 | 0000 | 0000 | 0000 |

MEDIA TECHNOLOGY (WRITE)

| MT | D1 | D2 | D3 | D4 |
|---|---|---|---|---|
| M0 | 0011 | 0011 | 0011 | 0000 |
| M1 | 0011 | 0011 | 0000 | 0000 |
| M2 | 0000 | 0011 | 0000 | 0000 |
| M3 | 0000 | 0000 | 0011 | 0000 |
| M4 | 0000 | 0000 | 0000 | 0000 |

FIG. 6

LIBRARY 1

| D1 | D2 | D3 | D4 |
|---|---|---|---|
| 0011 | 0000 | 0000 | 0000 |

LIBRARY 2

| D1 | D2 | D3 | D4 |
|---|---|---|---|
| 0011 | 0011 | 0000 | 0000 |

FIG. 7

DATA STORAGE SYSTEM WITH TABLE-DRIVEN DEVICE SELECTOR

BACKGROUND OF THE INVENTION

1. Field of the Invention

The present invention concerns the operation of a data storage library containing various kinds of data storage devices and various types of media. More particularly, the invention relates to a system that provides a list of all data storage device types in one or more data storage libraries, where each listed data storage device type is eligible to perform a requested storage operation. The system operates by receiving inputs such as recording technology and media type inputs, indexing these inputs with corresponding pre-prepared tables, and then combining the resultant indices to provide a list of eligible data storage device types in the one or more libraries.

2. Description of the Related Art

Large-scale data storage libraries often include thousands of different items of removable media. Such removable media items, for example, may include removable tape cartridges and/or optical cartridges. Even within one class of media (e.g. tape), different incompatible media items may exist. For example, different tape media may use different storage densities, access speeds, compaction types (or lack of compaction), and storage layouts (e.g. serpentine storage). As a more particular example, an IBM model 3495 Tape Library Dataserver may include media such as Cartridge System Tape ("CST"), Enhanced Capacity Cartridge System Tape ("ECCST"), and Magstar Tape. The CST uses 18-track or 36-track technology, ECCST uses 36 tracks, and Magstar Tape uses 128 tracks.

In addition to the diversity in media types, data storage libraries often include multiple different data storage device types, each of which may have unique features. The IBM model 3495 Tape Library Dataserver, for example, may include IBM 3490, IBM 3490E, and IBM 3590 tape drives. As another example, the IBM 3494 may include IBM 3490E and IBM 3590 tape drives.

Ensuring compatibility between tape devices and recording media can be one of the most significant problems in modern data storage libraries. One difficulty in tape libraries is ensuring that, when conducting data access, each type of tape media is always paired with a storage device capable of accessing that type of tape. Another problem involves selecting, among all the available media densities, the most appropriate media type to use for writing new data.

The following description illustrates some more specific examples of these types of problems. Data originally written to a medium using a base 3490 system with 18-track technology can only be overwritten using a 3490E storage device if recording starts at the beginning of the volume. Moreover, using a 3490E device to write additional data following existing data written in 18-track recording technology is not permitted. The 3490E illustrates partial compatibility in that it can mount CST media and read existing 18-track data or write new 36-track data starting at the beginning of the volume, but it cannot write 18-track data. The IBM 3590 however, does not provide downward compatibility—volumes written using existing 18-track or 36 track technology cannot be read or written using IBM 3590 devices.

Compatibility, then, can be a difficult issue to resolve in data storage libraries. In the past, this predicament has been addressed through the use of conditional software language, as shown in the pseudo-code example of Table 1.

TABLE 1

Conditional Software Language

```
IF NEW DATASET REQUESTED THEN
  IF MEDIA TYPE SPECIFIED IN REQUEST THEN
    IF CST REQUESTED THEN
      IF 18-TRACK RECORDING TECHNOLOGY REQUESTED
        THEN 3490 DEVICE REQUIRED
      ELSE
        IF 36-TRACK RECORDING TECHNOLOGY REQUESTED
          THEN 3490E DEVICE REQUIRED
        ELSE
          IF 128-TRACK RECORDING TECHNOLOGY
            REQUESTED THEN SET ERROR (CANNOT
            RECORD 128-TRACK ON CST)
          ELSE (RECORDING TECHNOLOGY NOT
            SPECIFIED) 3490 OR 3490E DEVICE
            SUITABLE
    ELSE
    IF ECCST REQUESTED THEN
      IF 18-TRACK RECORDING TECHNOLOGY REQUESTED
        THEN SET ERROR (CANNOT RECORD 18-TRACK
        ON ECCST)
      ELSE
        IF 36-TRACK RECORDING TECHNOLOGY
          REQUESTED THEN 3490E DEVICE
          REQUIRED
        ELSE
          IF 128-TRACK RECORDING TECHNOLOGY
            REQUESTED THEN SET ERROR
            (CANNOT RECORD 128 TRACK ON
            ECCST)
          ELSE (RECORDING TECHNOLOGY NOT
            SPECIFIED) 3490E DEVICE
            REQUIRED
    ELSE
    IF 3590 MEDIA REQUESTED THEN
      IF 18-TRACK RECORDING TECHNOLOGY
        REQUESTED THEN SET ERROR (CANNOT
        RECORD 18-TRACK ON 3590 MEDIA)
      ELSE
        IF 36-TRACK RECORDING TECHNOLOGY
          REQUESTED THEN SET ERROR
          (CANNOT RECORD 36-TRACK ON
          3590 MEDIA)
        ELSE
          IF 128-TRACK RECORDING
            TECHNOLOGY REQUESTED
            THEN 3590 DEVICE
            REQUIRED
          ELSE (RECORDING TECHNOLOGY
            NOT SPECIFIED) 3590
            DEVICE REQUIRED
    ELSE
      SET ERROR (INVALID MEDIA TYPE SPECIFIED)
  ELSE (MEDIA NOT SPECIFIED IN REQUEST)
    IF RECORDING TECHNOLOGY SPECIFIED ON REQUEST
      THEN
      IF 18-TRACK RECORDING TECHNOLOGY
        REQUESTED THEN 3490 DEVICE
        REQUIRED
      ELSE
        IF 36-TRACK RECORDING TECHNOLOGY
          REQUESTED THEN 3490E DEVICE
          REQUIRED
        ELSE
          IF 128-TRACK RECORDING
            TECHNOLOGY REQUESTED
            THEN 3590 DEVICE
            REQUIRED
          ELSE
            SET ERROR (INVALID
              RECORDING
              TECHNOLOGY
              SPECIFIED)
```

TABLE 1-continued

Conditional Software Language

ELSE (NEITHER MEDIA NOR RECORDING
TECHNOLOGY SPECIFIED ON REQUEST) 3490
DEVICE OR 3490E OR 3590 DEVICE SUITABLE

Traditionally, such device and media selection routines are implemented by a host processor in a library system. Although these conditional logic routines may be satisfactory for some applications, some users would enjoy certain improvements. For example, known conditional logic routines can be complex since they use an intricate series of nested "IF" statements. For the same reasons, these routines can be prone to error and difficult to debug. Furthermore, conditional logic routines are difficult to change, for example to reflect the addition of new media types, recording technologies, or device types.

Having the ability to change these routines is especially important because the addition of new media types, recording technologies, and storage devices is nearly certain with today's rapidly advancing storage technology. To correct errors or update the conditional logic routines, however a software programmer must take time to become familiar with the routines and then precisely change the source code to accommodate the necessary changes. Even in the case where a single media type is added, the programmer may have to painstakingly modify certain existing IF statements, cautiously construct new ones, and/or carefully delete other ones. The programmer must also test both old and new functions.

SUMMARY OF THE INVENTION

Broadly, the present invention concerns a method for identifying eligible data storage device types in one or more data storage libraries in response to a storage access request. A list of the eligible data storage device types is prepared by indexing input attributes with corresponding pre-prepared tables and then combining the resultant indices to provide a list of eligible data storage device types in the one or more libraries.

One embodiment of the invention concerns a method for operating a single data storage library by performing various steps. A request is first received for data access in the library. The request includes a RT attribute and a MT attribute. The RT attribute is indexed to a RT table to yield a RT "mask". Similarly, the MT attribute is indexed to a MT table to yield a MT "mask". In the RT and MT masks, storage device types may be represented by different codes to preference the device types with respect to each other. An output, called a "request mask", is prepared by performing a Boolean operation to combine the MT mask and the RT mask. The request mask identifies all "eligible" data storage device types, i.e., those device types in the library that are compatible with the received request.

As an alternative, the request mask may identify all eligible storage device types in multiple data storage libraries. In this embodiment, the request mask is compared against particular library masks to determine whether each corresponding library contains eligible storage device types.

In addition to methods such as those described above, a different aspect of the invention concerns a hardware apparatus (such as one or more data storage libraries) programmed to perform the above method. In still another embodiment, the invention may be implemented to provide an article of manufacture tangibly embodying a program of machine-readable instructions executable by a digital processing apparatus to perform a method as described above.

The invention affords its users with a number of distinct advantages. For example, the invention provides a data storage library with a media/device selection routine that can be updated by simply updating a table. It is no longer necessary to review, revise, supplement, and test arcane conditional software language such as a long series of embedded IF-THEN-ELSE statements. Consequently, media/device selection in accordance with the invention is less complicated and less prone to error.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein:

FIG. 4 is an exemplary RT write table, pursuant to an illustrative embodiment of the invention;

FIG. 5 is an exemplary RT read table, pursuant to an illustrative embodiment of the invention;

FIG. 6 is an exemplary MT table, pursuant to an illustrative embodiment of the invention; and FIG. 7 is an exemplary library table, pursuant to an illustrative embodiment of the invention.

DETAILED DESCRIPTION OF THE PREFERRED EMBODIMENTS

Hardware Components & Interconnections
Single Library Embodiment

Figure 1:
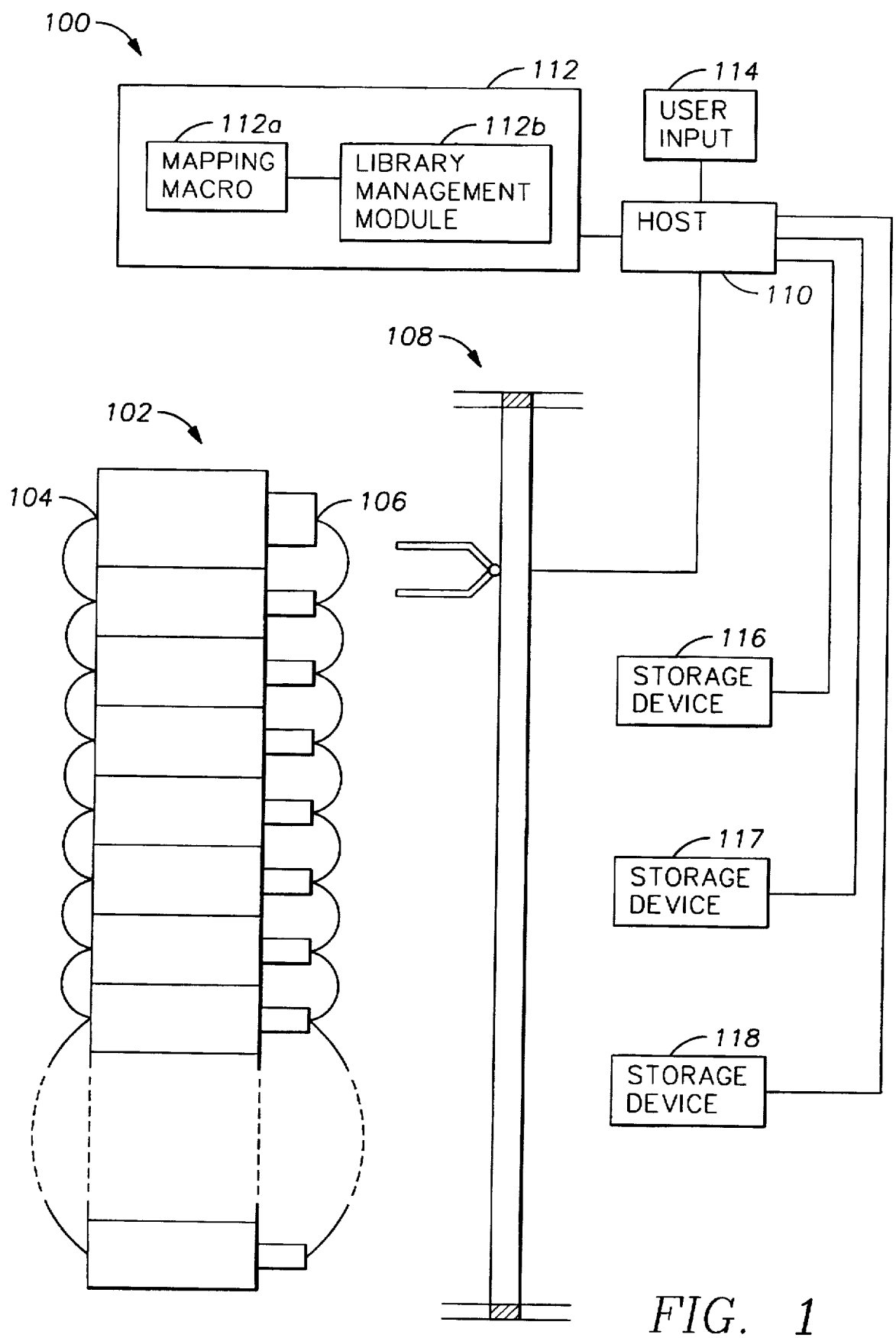
FIG. 1 is a diagram of hardware components and interconnections pursuant to one embodiment of the invention.

In one embodiment, the invention may be implemented using a single data storage library such as the library 100, shown in FIG. 1. The library 100 includes a storage rack 102 having a plurality of storage bins 104. Each bin is sized to accommodate one of a plurality of data storage cartridges 106, also called "data storage media". The cartridges 106 may have different sizes or the same size. In one example, the cartridges 106 house magnetic tape media such as IBM CST media, IBM ECCST media, and IBM Magstar media. CST media stores data in 18 or 36 track formats, ECCST media stores data in 36-track format, and Magstar media stores data in 128-track format.

The library 100 also includes a picker 108, which operates to conduct intra-bin transfers of cartridges 106 and to transfer cartridges 106 between the bin 102 and data storage devices 116–118. The picker 108 is managed by a host 110, which comprises a mainframe computer, microprocessor, or another digital processor.

The host 110 is coupled to a local storage unit 112 and a user input device 114. The user input device 114 relays input from a "user" to the host 110. The user may be a human operator, an application program, etc. The local storage unit 112 stores data related to the operation of the host 110, and may comprise RAM, ROM, DASD, WORM, or another suitable storage means.

The local storage unit 112 includes a mapping macro 112a and a library management module 112b. The library management module 112b is invoked by the host 110 to manage the library 100. The module 112b, for example, may comprise a software program of PLX or another high level language. As described in greater detail below, the mapping macro 112a contains various tables used to represent the types of media 106 and storage devices 116–118 present in the library 100, the areas of compatibility between the media and device types, and any preferences for matching certain media types with certain device types. Unlike prior arrangements, the library 100 may be easily updated to reflect the addition of newly added device or media types simply by amending the mapping macro 112a. Conveniently, no changes to the library management module 112b are needed, except a possible step of recompiling source code.

The devices 116–118 comprise data storage drives, which operate to read/write data from/to the cartridges 106. The devices 116–118 therefore transfer data between the cartridges 106 and the host 110. The devices 116–118 may embody different makes and models, such as the following models of IBM brand drives: 3490, 3490E, and 3590.

Multiple Library Embodiment

According to a different embodiment, the invention may be implemented using multiple data storage libraries, each like the library 100. Depending upon the requirements of the particular application, a multiple library system may share a single host 110, local storage unit 112, and user input 114. Each of the multiple libraries, however, includes its own storage rack 102, picker 108, and storage devices 116–118. It is therefore likely in actual implementation that each library may have a different collection of device types and media types than the other libraries.

Operation

In addition to the hardware environment of FIG. 1, a different aspect of the present invention concerns a method for identifying eligible types of data storage devices present in one or more data storage libraries. For explanatory purposes, this method is first described in the context of the hardware components of a single data storage library, as shown in FIG. 1. When implemented in the library 100, this method may be executed by the host 110 carrying out a sequence of machine-readable instructions.

Data Storage Medium

Figure 2:
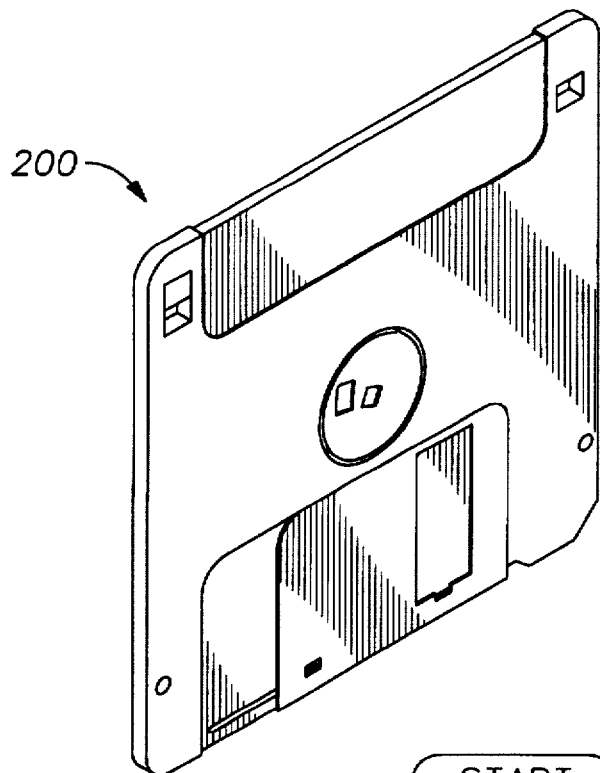
FIG. 2 is a diagram of an article of manufacture pursuant to one embodiment of the invention.

This sequence of machine-readable instructions may reside, for example, in memory associated with the host 110, such as the library management module 112b. Alternatively, the instructions may be contained on a data storage medium, such as a computer diskette 200 (FIG. 2). The instructions may also be stored on a DASD array, magnetic tape, conventional "hard drive", electronic read-only memory, optical storage device, paper "punch" cards, or another data storage medium. In this regard, one aspect of the present invention is an article of manufacture, comprising a data storage medium embodying such a sequence of machine-readable instructions.

In an illustrative embodiment of the invention, the machine-readable instructions may comprise lines of compiled PLX language code, where the instructions are executed by a host processor in a mainframe computer such as the IBM model S/390. Alternatively, these instructions may be written in another language, such as C or C++, where they are embodied by microcode of a storage device controller, such as an IBM model 3990-6 controller.

Operational Sequence—Single Library Embodiment

Figure 3:
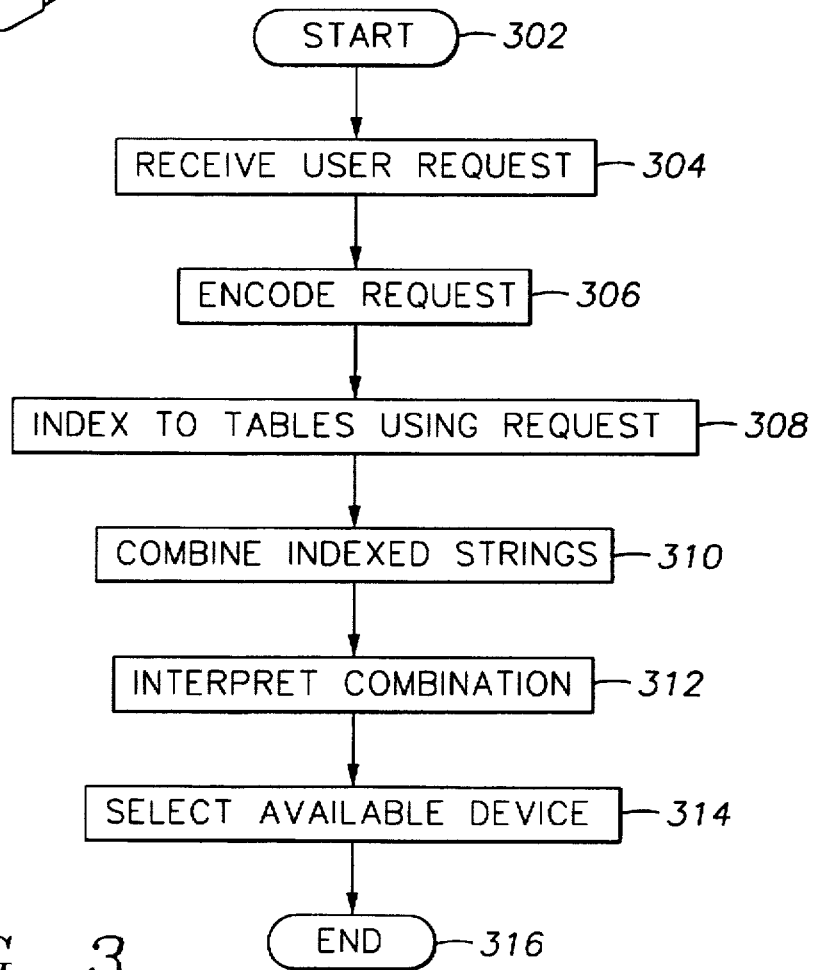
FIG. 3 is a flowchart of method steps to provide a list of all data storage device types appropriate to a requested storage operation in a single data storage library, pursuant to one embodiment of the invention.

Referring to FIG. 3, a sequence of tasks 300 is shown to illustrate one embodiment of method for identifying eligible data storage device types in a single data storage library.

A. Receiving Data Access Request

The sequence 300 is invoked each time a "user request" is received for data access in the library 100. In the illustrated embodiment, this request is received in task 304 from the user input device 114 and includes MT and RT attributes. In the present example, the MT attribute specifies either CST, ECCST, or Magstar media types. The RT attribute distinguishes between 18, 36, and 128 track recording densities. In the case of a write request, the RT and/or MT attributes may also be a "don't care", if the user doesn't care which type of media and/or recording technology is used. In the case of a read request, "don't care" is not a valid RT attribute since the media to be read already has an established recording density, which must be observed. As discussed in greater detail below, the user request may include additional or different attributes than the RT and MT attributes.

B. Encoding Request

After the user request is received in task 304, task 306 "encodes" the user request to enable table indexing, as discussed below. In the illustrated example, RT attributes are encoded (i.e., abbreviated) as R0 ("don't care"), R1 (18 track), R2 (36 track), and R3 (128 track). MT inputs are encoded as M0 ("don't care"), M1 (CST), and M2 (ECCST), and M3 (Magstar). In the present example, R4 and M4 are not used, these attributes being held open to represent a new RT and new MT in the future.

C. Indexing Tables

After the user request is encoded, the next step (task 308) indexes RT and MT tables using the encoded request, as follows. In the illustrated example, the RT and MT tables are contained in the mapping macro 112a for reference during operation of the library management module 112b.

1. Table Structure, Generally

As discussed in greater detail below, the RT and MT tables include a plurality of entries. Rows in the RT and MT tables correspond to the recording or media technology specified in the user request. Each column corresponds to a specific type of storage device ("device type") present in the system 100 or in a particular product line; the selection of device types represented in the columns is described in greater detail below. In the illustrated example, the device types are encoded as D1 (IBM 3490), D2 (IBM 3490E), and D3 (IBM 3590). In the present example, the device type D4 is being held open to represent a new device type in the future. The tables' entries comprise binary numbers, such as 0000, 0001, and 0011 in the present example. Each entry represents the "eligibility" of a particular storage device type (identified by the entry's column) for operations conducted with a particular RT or MT (identified by the entry's row). Eligibility concerns the issue of compatibility, whereas "availability" (a separate subject) concerns whether a specific storage device in the library is "busy".

In the illustrated example, a table value of 0000 indicates that the storage device type identified by that entry's column is not eligible for use in operations conducted with the user-requested RT or MT attribute. A value of 0001 indicates that the storage device type of that entry's column is eligible for use in operations conducted with the user-requested RT or MT. A value of 0011 indicates that the storage device type of that entry's column is preferred for operations conducted with the user-requested RT or MT. Multiple storage device types may be preferred for a given storage operation. The preference simply indicates that the associated device type is preferred over any device types containing 0001 in their columns. Where speed is critical, one device type may be preferred over another, for example, because it operates faster. In situations where speed is unimportant, a slower device type may be preferred, to reserve the faster device types for speed-critical operations.

This is explained in greater detail with the following specific description of the following exemplary RT and MT tables.

2. RT Table Structure

Separate RT tables are provided for reading and writing, since the selection of storage device types necessarily differs. When writing, the system 100 has flexibility in selecting a storage device type to write the data, whereas reading requires a storage device type that is compatible with the specified media.

FIG. 4 depicts an exemplary RT-write table 400. The column 402 lists all RT attributes: R0, R1, R2, R3, and R4. Columns 403–406 contain entries corresponding to first, second, third, and fourth storage device types: D1, D2, D3, and D4. As mentioned above, each entry may comprise a binary 0000, 0001, or 0011.

In the row 408, for example, the three 0001 values indicate that, for a "don't care" user request, all device types are eligible. In the row 409, the 0001 in column 403 indicates that, for a user request specifying R1, device type D1 is the only eligible storage device type. In row 410, only D2 is eligible for user requests specifying R2. In row 411, only D3 is eligible for user requests specifying R3. The entries for R4 (row 412) are 0000 because, in the present example, R4 is being reserved for future recording technology not presently available.

FIG. 5 depicts an exemplary RT-read table 500. The column 502 lists all RT attributes: R0, R1, R2, R3, and R4. Columns 503–506 contain entries corresponding to the first, second, third and fourth storage device types: D1, D2, D3, and D4. These are the same device types as in FIG. 3. As mentioned above, each entry comprises binary 0000, 0001, or 0011.

In row 508, the "N/A" entries indicate that R0 is "not applicable" in the case of a read operation. This is because "don't care" is not a valid recording technology for read operations. The 0011 in column 503, row 509 indicates that, for a R1 user request, D1 is one preferable storage device type. The 0001 in column 504, row 509 indicates that, for a R1 user request, D2 is also eligible, but not preferable to D1. This specific preferencing is used in the present example because it is more efficient to process the R1 requests (18 track) with D1 (IBM model 3490) device types than with D2 (IBM model 3490E) device types, although both types of devices can do the job. The 0000 values in column 503, rows 510–511 indicate that device type D1 is not compatible with user requests specifying R2 or R3 as the RT attribute. As in FIG. 4, R4 is reserved for a future RT, not yet available in the library 100.

3. MT Table Structure

FIG. 6 depicts an exemplary MT table 600. The column 602 lists all MTs: M0, M1, M2, M3 and M4. Columns 603–606 contain entries corresponding to first, second, third, and fourth storage device types: D1, D2, D3 and D4. These are the same device types as those in FIGS. 4–5. As mentioned above, each table entry comprises a binary 0000, 0001, or 0011.

In the row 606, the 0011 values indicate that, for a "don't care" user request, all device types are preferable. Likewise, the 0011 in column 603, row 607 indicates that, if the user's request specifies M1, device type D1 is one preferable storage device type (D2 is another preferable storage device type, as shown in column 604, row 607). The 0000 values of column 603, rows 608–609 indicate that device type D1 is not compatible with user requests specifying M2 or M3 as the MT.

4. RT/MT Attributes Represented in Tables

Columns of the tables 400, 500, and 600 preferably represent all device types of a particular product line (such as all IBM tape storage devices), regardless of whether any of those device types are represented by devices actually installed in the library 100. The device types absent from the library are easily accounted for by entering "0000" values in the corresponding table columns. Similarly, more RT and MT attributes may also be shown in the tables 400/500/600 than those of the device types D1–D4, simply by entering "0000" values in rows of the unsupported RT and MT attributes.

As an alternative, the tables 400/500/600 may instead be limited to those device types actually installed in the library 100. Or, as another alternative (discussed in greater detail below), the tables 400/500/600 may be limited to those devices actually installed in the library 100.

5. Indexing the Tables

Having described the structure of Tables 400, 500, and 600, task 308 is explained as follows. Task 308 employs the user request to index the appropriate tables and create respective "masks". Each table is indexed according to the RT and MT attributes specified in the user request.

To use a specific example, a user request specifying a read operation with attributes R1 and M1 is considered. Task 308 first indexes the RT-read table 500 to locate the row of entries identified with R1. Table 2 (below) depicts these entries:

TABLE 2

| Example of R1 Entries |
| --- |
| 0011 0001 0000 0000 |

These entries comprise the RT "mask." Next task 308 indexes the MT table 600 to locate the row of entries identified by M1. Table 3 (below) depicts these entries:

TABLE 3

| Example of M1 Entries |
| --- |
| 0011 0011 0000 0000 |

These entries comprise the MT mask. Having generated the RT and MT masks, the routine 300 progresses to task 310.

D. Combining Indexed Outputs (Masks)

Task 310 combines the masks generated in task 308. In the illustrated example, RT and MT masks are combined using the Boolean AND operation to combine entries of corresponding columns. Table 4 (below) shows the result for the above example, called a "request mask."

TABLE 4

| Example of Combined R1/M1 Entries |
| --- |
| 0011 0001 0000 0000 |

The request mask indicates which storage device types, of those represented in the tables 400/500/600, are appropriate to the user's request.

E. Interpreting Result

Next, step 312 interprets the request mask. A "0000" value in the request mask indicates that the corresponding storage device type is not a proper choice, i.e. not "eligible." A "0001" value indicates that the corresponding storage device type may be used, i.e. this device type is eligible. A "0011" value indicates that the corresponding storage device type may be used, and that it is preferred over any device types represented by "0001" in the request mask.

In the above example, then, the request mask indicates that storage device type D1 is preferred, D2 is eligible, and D3 and D4 are not proper choices. Since the entry for D1 contains "0011" and the entry for D2 contains "0001", there is a preference for D1 over D2.

Task 312 refers names of the "eligible" and "preferred" device types to a "device type pool" (not shown), along with their status as being either eligible or preferred. Subsequently, task 314 evaluates the storage device types listed in the device type pool and selects a storage device actually installed in the library 100 to use for the requested transaction. This is performed by selecting an available (i.e., non-busy) device of the preferred device type. If there are no preferred device types, a device is selected from the pool of "eligible" device types.

If the device type pool lists multiple device types, or if the library 100 is operating multiple devices of the type given in the device type pool, various criteria may be used to select one device. These criteria may consider, for example, which devices are currently available (i.e., not being used to access data), which devices are physically near the recording medium to be loaded, and/or other criteria.

There may be cases, however, in which no device type satisfies the user request (i.e., the request masks contains 0000 for all device types). In this case, task 312 does not contribute to the device pool, and task 314 generates an error message to advise the host 110 and/or user of the error.

F. Operation of Preferencing Scheme

As explained below, the use of 0000, 0001, and 0011 table entries provides a preferencing scheme for selecting the best type of storage device to use. If an RT input yields a RT mask of 0000 for a particular storage device type, then irrespective of the MT mask, the request mask for that storage device type will be 0000, since 0000 ANDed with anything is 0000. If an RT input yields a RT mask of 0001 for a particular storage device type, then whether the MT mask is 0001 or 0011, the request mask for that storage device type is limited to 0001. In other words, even if a storage device type is preferred in the MT table (i.e., having a 0011 value), that storage device type can be nothing more than "acceptable" (not preferred) if the corresponding RT entry is 0001.

If a device type is preferred in both RT and MT tables, however, its resultant value in the request mask will be 0011. This device type will thus be preferred over other device types represented in the request mask by 0001.

If desired, additional preferencing levels may also be used, for example, by utilizing table values of 0111 and 1111. In this system, the following preferencing hierarchy may be used, to illustrate one example:

TABLE 5

| | Expanded Preferencing Hierarchy |
|---|---|
| 0000 | Device Type Not Eligible. |
| 0001 | Device Type Eligible. |
| 0011 | Device Type Preferred Over Eligible Device Types. |

TABLE 5-continued

| | Expanded Preferencing Hierarchy |
|---|---|
| 0111 | Device Type Superior to Preferred or Eligible. |
| 1111 | Device Type More Desirable than Superior, Preferred or Eligible. |

Operational Sequence—Multiple Library Embodiment

In contrast to the sequence of tasks 300 described above, the invention may also be implemented in a system having multiple data storage libraries. Broadly, this is achieved with the use of one additional table (a "library table") for each library. Each library table contains a single "library mask" indicating which types of storage devices are installed in that particular library. The request mask (from task 310) is separately combined with each library mask to form "library-specific" masks indicating the eligibility and preferencing among the different types of storage devices actually installed in that library.

To illustrate an exemplary implementation of such a system, FIG. 7 depicts library tables for use in a system having two libraries. Each library table comprises a library mask, where each entry indicates whether a particular type of storage device is present or not in that library. Preferencing is established solely in the RT and MT tables. Accordingly, the library masks need only include 0000 and 0011 values (as illustrated) to indicate that the corresponding library contains (i.e., 0011) or does not contain (i.e., 0000) the corresponding device type. If the RT and MT tables employ an expanded preferencing scheme (e.g. 1111), then entries of each library mask need only include 0000 and the maximum level of preferencing (e.g. 1111).

In the example of FIG. 7, the library table 700 indicates that the first library only contains storage devices of type D1. According to the library table 702, the second library contains storage devices of both D1 and D2 types. In the case of the first library, even if the request mask indicates a preference for D2 or D3, these entries will be "zeroed" out when they are ANDed with the corresponding 0000 values in the first library table 702. A preference for D2 could be realized in the second library, however, whose table shows the presence of D2 type devices.

The selection of storage device types in a multiple library system is performed largely as shown in the sequence 300 of FIG. 3, as described above. The range of device types represented in the tables 400, 500, and 600 in this system may include all device types in a given product line, or they may be restricted to the device types present in the aggregate of the multiple libraries. Preferably, the former approach is used, since this permits a single version of the tables 400, 500, and 600 for any possible library, regardless of which storage devices are actually installed in the library. When multiple libraries are used, task 310 involves the additional steps of separately combining the request mask with each different library mask, thereby creating an output of multiple library-specific request masks.

In task 312, each library-specific request mask is separately interpreted to determine which storage device types satisfy the user request in that library. In particular, a 0000 value in a library-specific request mask indicates that the corresponding storage device type is not eligible for use in the corresponding library. This may result from incompatibility between the attributes of the user request and the storage device types represented in the tables 400/500/600; alternatively, this may be the result of this particular storage device type not being installed in the library. A 0001 value in the library-specific request mask indicates that the corresponding storage device type is installed in the library, and that this device type is eligible to satisfy the RT and MT attributes of the user request. A 0011 value indicates that the corresponding device type is installed in the particular library, and that is preferred over any device types represented by 0001 in the library-specific request mask.

In a multiple library environment, the library masks may be designed to establish a preferred library for a particular user request. This is in contrast to the illustrated embodiment (FIG. 7), in which values of the library masks were limited to 0000 and 0011 to represent device types not installed or installed (respectively) in the respective libraries. To prefer one library over another library in satisfying a user request, the same device type is represented by different values in each library mask. For example, if greater efficiency is to be realized by using D1 type devices in the first library rather than the second library, the first library table 700 may include the value 0011 beneath D1 while the second library table 702 includes 0001 beneath D1. This modification therefore establishes a dual preferencing scheme, in which preference for one storage device type over another is established by input attributes such as RT and MT, and one library may be preferenced over another by pre-set values in the library masks. Each library mask, of course, is modified any time a new type of storage device is installed in that library, or one type of storage device is completely removed from the library.

Updating the Mapping Macro

The process of operating the multi-library system of the invention preferably also includes additional steps of updating the mapping macro 112a by revising each library table to reflect any storage device types that have been newly installed or removed from the corresponding library.

Other Embodiments

While there have been shown what are presently considered to be preferred embodiments of the invention, it will be apparent to those skilled in the art that various changes and modifications can be made herein without departing from the scope of the invention as defined by the appended claims. The following are some examples, although skilled artisans (with the benefit of this disclosure) may recognize others as well.

Preferences When "Don't Care" Specified

In table 400, all device types were represented by 0001 values for those user write requests where RT was a "don't care." Similarly, the MT table 600 gave all device types 0011 values for those user requests indicating MT as a "don't care." As an example of one alternative embodiment of the invention, however, the "don't care" entries of Tables 400, 500, and 600 may be selected to implement a desired preferencing scheme for selecting a device type in the absence of user input on the subject. In particular, the "don't care" rows of tables 400 and 600 may be filled with a combination of 0000, 0001, and 0011 values to prefer certain device types over certain others. Device types employing newer technology, for example, may be preferred over older device types, or vice versa. Or, a different example, one particular device type may be required to the exclusion of all others to help speed the transition to a new technology used by that particular device type.

Additional/Different Input Attributes

It should also be apparent to artisans of ordinary skill (having the benefit of this disclosure) that different or additional tables may be used than the tables 400, 500, and 600 to implement different device type selection criteria. For example, additional tables may be provided cross-referencing device types with attributes such as compaction technology, mount time, data transfer speed, and the like. The resultant masks of these tables would be combined with the RT and MT masks in task 310 to provide a resultant request mask that includes the additional input criteria. Alternatively, such criteria may be substituted for the RT and MT input by using the appropriate tables instead of the tables 400, 500, and 600.

Device Types vs. Devices

In the embodiments illustrated above, the RT and MT tables contained columns corresponding to each different type of storage device present in a library, a group of multiple libraries, or in an entire product line. The invention also contemplates a different embodiment, where the entries of the RT and MT tables correspond to a specific system of one or more libraries. Accordingly, each column in this embodiment represents a specific data storage device actually installed in the system rather than a type of device that may be represented in the system (by one or more actual devices) or may not be present in the system at all.

Media Type

Ordinarily skilled artisans (having the benefit of this disclosure) will also recognize that the present invention is not limited to the context of tape media and tape storage devices. The invention may also be implemented in data storage libraries using other media, including optical storage disks, magnetic diskettes, and other storage media, as well as various combinations of such media in one or more libraries.

What is claimed is:

1. A method for identifying eligible data storage device types in a data storage library that includes multiple data storage device types, the method comprising the steps of:

(a) receiving a user request for data access in the library, said request specifying a recording technology ("RT") attribute and a media type ("MT") attribute;

(b) indexing the RT attribute to a RT table that contains information cross-referencing RT attributes with data storage device types in the library compatible with said RT attributes, said indexing yielding a RT mask identifying data storage device types in the library compatible with the RT attribute of the user request, the RT mask comprising a binary string;

(c) indexing the MT attribute to a MT table that contains information cross-referencing MT attributes with data storage device types in the library compatible with said MT attributes, said indexing yielding a MT mask identifying data storage device types in the library compatible with the MT attribute of the user request, the MT mask comprising a binary string; and (d) combining the MT mask and the RT mask with a Boolean operation to produce a request mask identifying data storage device types in the library compatible with the RT and MT attributes of the user request.

2. The method of claim 1, the Boolean operation including an AND operation.

3. The method of claim 1, the RT attribute identifying a number of data storage tracks.

4. The method of claim 1, the RT attribute identifying a storage density.

5. The method of claim 1, the RT attribute identifying a type of data compaction.

6. The method of claim 1, the RT attribute identifying a data storage layout.

7. The method of claim 6, the data storage layout including specification of serpentine storage parameters.

8. The method of claim 1, the RT attribute identifying a data access speed.

9. The method of claim 1, the MT attribute identifying a type of tape storage device.

10. The method of claim 1, the MT attribute identifying a type of optical data storage device.

11. The method of claim 1, the RT mask comprising a sequence of binary numbers, each binary number corresponding to a different storage device type in the library.

12. The method of claim 11, each binary number being selected from a list comprising: 0, 1, and 11.

13. The method of claim 11, each binary number representing a predetermined preference for use of the corresponding storage device type.

14. The method of claim 1, the MT mask comprising a sequence of binary numbers, each binary number corresponding to a different storage device type in the library.

15. The method of claim 14, each binary number being selected from a list comprising: 0, 1, and 11.

16. The method of claim 14, each binary number representing a predetermined preference for use of the corresponding storage device type.

17. The method of claim 1, the step of indexing the RT attribute to a RT table comprising the steps of:

indexing the RT attribute to a RT-read table if the user request specifies a read operation; and indexing the RT attribute to a RT-write table if the user request specifies a write operation.

18. A method for identifying eligible data storage device types in at least one data storage library including multiple data storage device types, the method comprising the steps of:

(a) receiving a user request for data access in the at least one library, said request specifying a recording technology ("RT") attribute and a media type ("MT") attribute;

(b) indexing the RT attribute to a RT table that contains information cross-referencing RT attributes with data storage device types in the at least one library compatible with said RT attributes, said indexing yielding a RT mask identifying data storage device types in the at least one library compatible with the RT attribute of the user request;

(c) indexing the MT attribute to a MT table that contains information cross-referencing MT attributes with data storage device types in the at least one library compatible with said MT attributes, said indexing yielding a MT mask identifying data storage device types in the at least one library compatible with the MT attribute of the user request;

(d) combining the MT mask and the RT mask to produce a request mask identifying data storage device types in the at least one library compatible with the RT and MT attributes of the user request; and (e) combining the request mask with a first library mask representing data storage device types installed in the at least one library to yield a library-specific request mask identifying data storage device types in the at least one library compatible with the RT and MT attributes of the user request.

19. The method of claim 18, the at least one data storage library being one library.

20. The method of claim 18, the at least one data storage library including multiple libraries.

21. The method of claim 20, step (e) comprising the steps of:

combining the request mask with a first library mask representing data storage device types installed in a first one of the multiple libraries to yield a first library-specific request mask identifying data storage device types in a first one of the multiple libraries compatible with the RT and MT attributes of the user request.

22. The method of claim 21, further comprising the steps of:

combining the request mask with a second library mask representing data storage device types installed in a second one of the multiple libraries to yield a second library-specific request mask identifying data storage device types in a second one of the multiple libraries compatible with the RT and MT attributes of the user request.

23. An article of manufacture comprising a data storage medium tangibly embodying a program of machine-readable instructions executable by a digital processing apparatus to perform method steps for identifying eligible data storage device types in a data storage library that includes multiple data storage device types, said method steps comprising:

(a) receiving a user request for data access in the library, said request specifying a recording technology ("RT") attribute and a media type ("MT") attribute;

(b) indexing the RT attribute to a RT table that contains information cross-referencing RT attributes with data storage device types in the library compatible with said RT attributes, said indexing yielding a RT mask identifying data storage device types in the library compatible with the RT attribute of the user request, the RT mask comprising a binary string;

(c) indexing the MT attribute to a MT table that contains information cross-referencing MT attributes with data storage device types in the library compatible with said MT attributes, said indexing yielding a MT mask identifying data storage device types in the library compatible with the MT attribute of the user request, the MT mask comprising a binary string; and (d) combining the MT mask and the RT mask with a Boolean operation to produce a request mask identifying data storage devices in the library compatible with the RT and MT attributes of the user request.

24. The article of manufacture of claim 23, the Boolean operation including an AND operation.

25. The article of manufacture of claim 23, the RT attribute identifying a number of data storage tracks.

26. The article of manufacture of claim 23, the RT attribute identifying a storage density.

27. The article of manufacture of claim 23, the RT attribute identifying a type of data compaction.

28. The article of manufacture of claim 23, the RT attribute identifying a data storage layout.

29. The article of manufacture of claim 28, the data storage layout including specification of serpentine storage parameters.

30. The article of manufacture of claim 23, the RT attribute identifying a data access speed.

31. The article of manufacture of claim 23, the MT attribute identifying a type of tape storage device.

32. The article of manufacture of claim 23, the MT attribute identifying a type of optical data storage device.

33. The article of manufacture of claim 23, the RT mask comprising a sequence of binary numbers, each binary number corresponding to a different storage device type in the library.

34. The article of manufacture of claim 33, each binary number being selected from a list comprising: 0, 1, and 11.

35. The article of manufacture of claim 33, each binary number representing a predetermined preference for use of the corresponding storage device type.

36. The article of manufacture of claim 23, the MT mask comprising a sequence of binary numbers, each binary number corresponding to a different storage device type in the library.

37. The article of manufacture of claim 36, each binary number being selected from a list comprising: 0, 1, and 11.

38. The article of manufacture of claim 36, each binary number representing a predetermined preference for use of the corresponding storage device type.

39. The article of manufacture of claim 23, the step of indexing the RT attribute to a RT table comprising the steps of:

indexing the RT attribute to a RT-read table if the user request specifies a read operation; and indexing the RT attribute to a RT-write table if the user request specifies a write operation.

40. An article of manufacture comprising a data storage medium tangibly embodying a program of machine-readable instructions executable by a digital processing apparatus to perform method steps for identifying eligible data storage device types in multiple data storage libraries each of said libraries including multiple data storage devices, the method comprising the steps of:

(a) receiving a user request for data access in the libraries, said request specifying a recording technology ("RT") attribute and a media type ("MT") attribute;

(b) indexing the RT attribute to a RT table that contains information cross-referencing RT attributes with data storage device types in the libraries compatible with said RT attributes, said indexing yielding a RT mask identifying data storage device types in the libraries compatible with the RT attribute of the user request;

(c) indexing the MT attribute to a MT table that contains information cross-referencing MT attributes with data storage device types in the libraries compatible with said MT attributes, said indexing yielding a MT mask identifying data storage device types in the libraries compatible with the MT attribute of the user request;

(d) combining the MT mask and the RT mask to produce a request mask identifying data storage device types in the libraries compatible with the RT and MT attributes of the user request; and (e) combining the request mask with a first library mask representing types of data storage devices in a first one of the libraries to yield a library-specific request mask identifying data storage device types in the first library compatible with the RT and MT attributes of the user request.

41. The article of manufacture of claim 40, the at least one data storage library being one library.

42. The article of manufacture of claim 40, the at least one data storage library including multiple libraries.

43. The article of manufacture of claim 42, step (e) comprising the steps of:

combining the request mask with a first library mask representing data storage device types installed in a first one of the multiple libraries to yield a first library-specific request mask identifying data storage device types in a first one of the multiple libraries compatible with the RT and MT attributes of the user request.

44. The article of manufacture of claim 43, further comprising the steps of:

combining the request mask with a second library mask representing data storage device types installed in a second one of the multiple libraries to yield a second library-specific request mask identifying data storage device types in a second one of the multiple libraries compatible with the RT and MT attributes of the user request.

45. A data storage system, comprising:

a data storage library including multiple types of data storage devices; and a processor programmed to perform method steps for identifying eligible data storage device types in the data storage library, said method steps comprising:

(a) receiving a user request for data access in the library, said request specifying a recording technology ("RT") attribute and a media type ("MT") attribute;

(b) indexing the RT attribute to a RT table that contains information cross-referencing RT attributes with data storage device types in the library compatible with said RT attributes, said indexing yielding a RT mask identifying data storage device types in the library compatible with the RT attribute of the user request, the RT mask comprising a binary string;

(c) indexing the MT attribute to a MT table that contains information cross-referencing MT attributes with data storage device types in the library compatible with said MT attributes, said indexing yielding a MT mask identifying data storage device types in the library compatible with the MT attribute of the user request the MT comprising a binary string; and (d) combining the MT mask and the RT mask with a Boolean operation to produce a request mask identifying data storage device types in the library compatible with the RT and MT attributes of the user request.

46. The system of claim 45, the Boolean operation including an AND operation.

47. The system of claim 45, the RT attribute identifying a number of data storage tracks.

48. The system of claim 45, the RT attribute identifying a storage density.

49. The system of claim 45, the RT attribute identifying a type of data compaction.

50. The system of claim 45, the RT attribute identifying a data storage layout.

51. The system of claim 50, the data storage layout including specification of serpentine storage parameters.

52. The system of claim 45, the RT attribute identifying a data access speed.

53. The system of claim 45, the MT attribute identifying a type of tape storage device.

54. The system of claim 45, the MT attribute identifying a type of optical data storage device.

55. The system of claim 45, the RT mask comprising a sequence of binary numbers, each binary number corresponding to a different storage device type in the library.

56. The system of claim 55, each binary number being selected from a list comprising: 0, 1, and 11.

57. The system of claim 55, each binary number representing a predetermined preference for use of the corresponding storage device type.

58. The system of claim 45, the MT mask comprising a sequence of binary numbers, each binary number corresponding to a different storage device type in the library.

59. The system of claim 58, each binary number being selected from a list comprising: 0, 1, and 11.

60. The system of claim 58, each binary number representing a predetermined preference for use of the corresponding storage device type.

61. The system of claim 45, the step of indexing the RT attribute to a RT table comprising the steps of:

indexing the RT attribute to a RT-read table if the user request specifies a read operation; and indexing the RT attribute to a RT-write table if the user request specifies a write operation.

62. A data storage system, comprising:

multiple data storage libraries, each of said libraries including multiple types of data storage devices; and a processor programmed to perform method steps for identifying eligible data storage device types in the multiple data storage libraries, the method steps comprising the steps of:

(a) receiving a user request for data access in the libraries, said request specifying a recording technology ("RT") attribute and a media type ("MT") attribute;

(b) indexing the RT attribute to a RT table that contains information cross-referencing RT attributes with data storage device types in the libraries compatible with said RT attributes, said indexing yielding a RT mask identifying data storage device types in the libraries compatible with the RT attribute of the user request;

(c) indexing the MT attribute to a MT table that contains information cross-referencing MT attributes with data storage device types in the libraries compatible with said MT attributes, said indexing yielding a MT mask identifying data storage device types in the libraries compatible with the MT attribute of the user request;

(d) combining the MT mask and the RT mask to produce a request mask identifying data storage device types in the libraries compatible with the RT and MT attributes of the user request; and (e) combining the request mask with a first library mask representing types of data storage devices in a first one of the libraries to yield a library-specific request mask identifying data storage device types in the first library compatible with the RT and MT attributes of the user request.

63. The system of claim 62, where the user request additionally specifies the first library, step (c) being responsive to specification of the first library in the user request.

64. The system of claim 62, the at least one data storage library including multiple libraries.

65. The system of claim 64, step (e) comprising the steps of:

combining the request mask with a first library mask representing data storage device types installed in a first one of the multiple libraries to yield a first library-specific request mask identifying data storage device types in a first one of the multiple libraries compatible with the RT and MT attributes of the user request.

66. The system of claim 65, further comprising the steps of:

combining the request mask with a second library mask representing data storage device types installed in a second one of the multiple libraries to yield a second library-specific request mask identifying data storage device types in a second one of the multiple libraries compatible with the RT and MT attributes of the user request.

* * * * *